United States Patent
Kim et al.

(10) Patent No.: US 10,559,834 B2
(45) Date of Patent: Feb. 11, 2020

(54) SEPARATOR FOR FUEL CELL

(71) Applicants: HYUNDAI MOTOR COMPANY, Seoul (KR); KIA MOTORS CORPORATION, Seoul (KR)

(72) Inventors: Kyung Min Kim, Namyangju-si (KR); Sang Mun Jin, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 275 days.

(21) Appl. No.: 15/647,347

(22) Filed: Jul. 12, 2017

(65) Prior Publication Data
US 2018/0175404 A1 Jun. 21, 2018

(30) Foreign Application Priority Data
Dec. 16, 2016 (KR) .......................... 10-2016-0172463

(51) Int. Cl.
| | |
|---|---|
| *H01M 8/0258* | (2016.01) |
| *H01M 8/04291* | (2016.01) |
| *H01M 8/023* | (2016.01) |
| *H01M 8/0247* | (2016.01) |
| *H01M 8/10* | (2016.01) |
| *H01M 8/1018* | (2016.01) |

(52) U.S. Cl.
CPC ......... *H01M 8/0258* (2013.01); *H01M 8/023* (2013.01); *H01M 8/0247* (2013.01); *H01M 8/04291* (2013.01); *H01M 8/10* (2013.01); *H01M 2008/1095* (2013.01)

(58) Field of Classification Search
CPC combination set(s) only.
See application file for complete search history.

(56) References Cited

U.S. PATENT DOCUMENTS

| | | | | |
|---|---|---|---|---|
| 2006/0068252 A1* | 3/2006 | An | ...................... | H01M 8/0258 429/457 |
| 2007/0111083 A1* | 5/2007 | Kikuchi | .............. | H01M 8/0256 429/414 |
| 2013/0130152 A1* | 5/2013 | Couse | ................. | H01M 8/0258 429/508 |

FOREIGN PATENT DOCUMENTS

KR 10-2010-0051257 A 5/2010

* cited by examiner

*Primary Examiner* — Christopher P Domone
(74) *Attorney, Agent, or Firm* — Morgan, Lewis & Bockius LLP (57) ABSTRACT

A separator for a fuel cell includes a plurality of channels formed in a reaction surface in the direction of gravity in order to permit reaction gas and generated water to flow therethrough. The fuel cell includes a membrane electrode assembly (MEA) and a gas diffusion layer (GDL). The channels have a wave shape in the reaction surface, and each of the channels includes curved portions and straight portions that are arranged alternately.

18 Claims, 7 Drawing Sheets

FIG. 1

Prior Art

FIG. 2

Prior Art

UPPER REGION    MIDDLE REGION    LOWER REGION

FIG. 7A        FIG. 7B        FIG. 7C

SEPARATOR FOR FUEL CELL

CROSS-REFERENCE TO RELATED APPLICATION

This application claims the benefit of priority to Korean Patent Application No. 10-2016-0172463, filed on Dec. 16, 2016 in the Korean Intellectual Property Office, the disclosure of which is incorporated herein by reference.

TECHNICAL FIELD

The present disclosure relates to a separator for a fuel cell, and more particularly to a separator for a fuel cell, which is capable of effectively discharging generated water and of improving humidification.

BACKGROUND

A fuel cell refers to a type of electric power generator that converts chemical energy of a fuel into electrical energy in a fuel cell stack via an electrochemical reaction. Such a fuel cell is used for the supply of electric power to small-sized electrical/electronic devices, for example, portable devices, as well as for the supply of electric power to industrial and household appliances and to vehicles. With the increase in demand for high-efficient clean energy, the range of application areas of the fuel cell has been continuously increasing.

Figure 1:
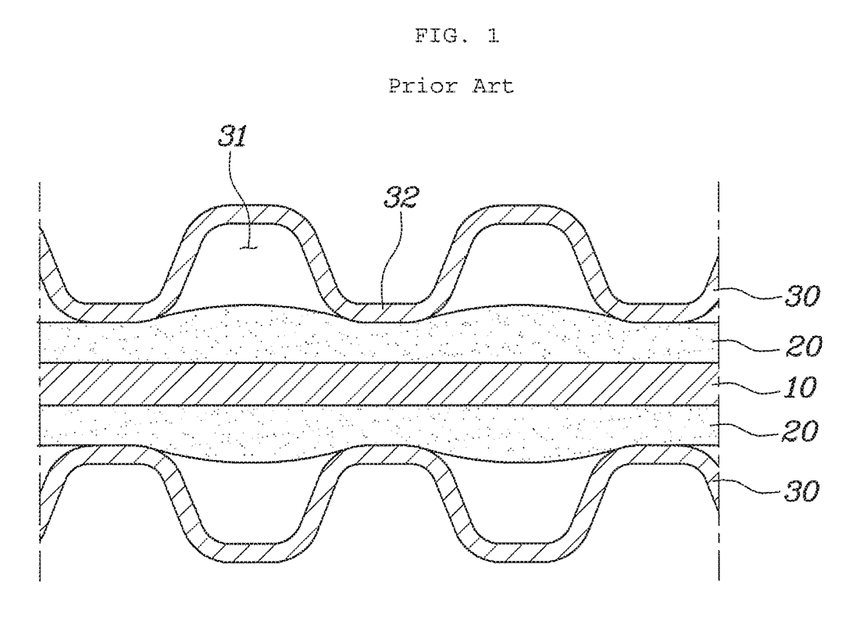
FIG. 1 is an exploded view illustrating the constitution of a unit cell of a general fuel cell stack.

FIG. 1 is an exploded view illustrating the constitution of a unit cell of a general fuel cell stack.

As shown in FIG. 1, a unit cell of a general fuel cell includes a membrane electrode assembly (MEA) 12, which includes a polymer electrolyte membrane having hydrogen cation (proton) conductivity and catalyst layers, i.e. an air electrode (cathode) and a fuel electrode (anode), coated on both surfaces of the electrolyte membrane so as to permit reaction between hydrogen and oxygen, a pair of gas diffusion layers (GDLs) 20, which is disposed on the respective electrode of the membrane electrode assembly 10 in order to aid diffusion of reaction gas, and a separator 30, which is closely adhered to each of the gas diffusion layers 20 in order to supply the reaction gas. Although not illustrated in the drawings, a porous member, which is capable of dispersing and diffusing gas, may be interposed between each of the gas diffusion layers 20 and the separator 30.

The separator 30 functions to maintain the shape of the fuel cell stack by electrically connecting the membrane electrode assembly 10 to another one and supporting the same while preventing hydrogen and oxygen, which are reaction gases, from being mixed with each other.

Therefore, the separator 30 must have a dense structure so as to prevent the reaction gases from being mixed with each other. Further, the separator 30 must have excellent conductivity and improved strength so as to serve as a conductor and a supporter. Accordingly, a separator made of a metal material is primarily used.

The separator includes channel portions and land portions, which are respectively spaced equidistantly apart from each other and extend parallel to each other along the direction in which the reaction gas flows. The channel portion serves as a passage through which the reaction gas flows and a passage through which water generated by the electrochemical reaction of hydrogen and oxygen during the operation of the fuel cell (hereinafter, referred to as "generated water") is discharged to the outside of the fuel cell stack.

If the water generated due to the reaction of the fuel cell is not discharged smoothly but remains in the fuel cell stack, it may locally impede diffusion and exhaust of the reaction gas, causing degradation of the performance and efficiency of the fuel cell.

When the passage defined by the channel portion is blocked by the generated water, the generated water may sometimes be discharged due to the differential pressure of the reaction gas. However, there is a problem in that the discharge of the generated water is not achieved smoothly in a low-current section because the gas flow rate is low and the differential pressure is not that large in the low-current section.

Figure 2:
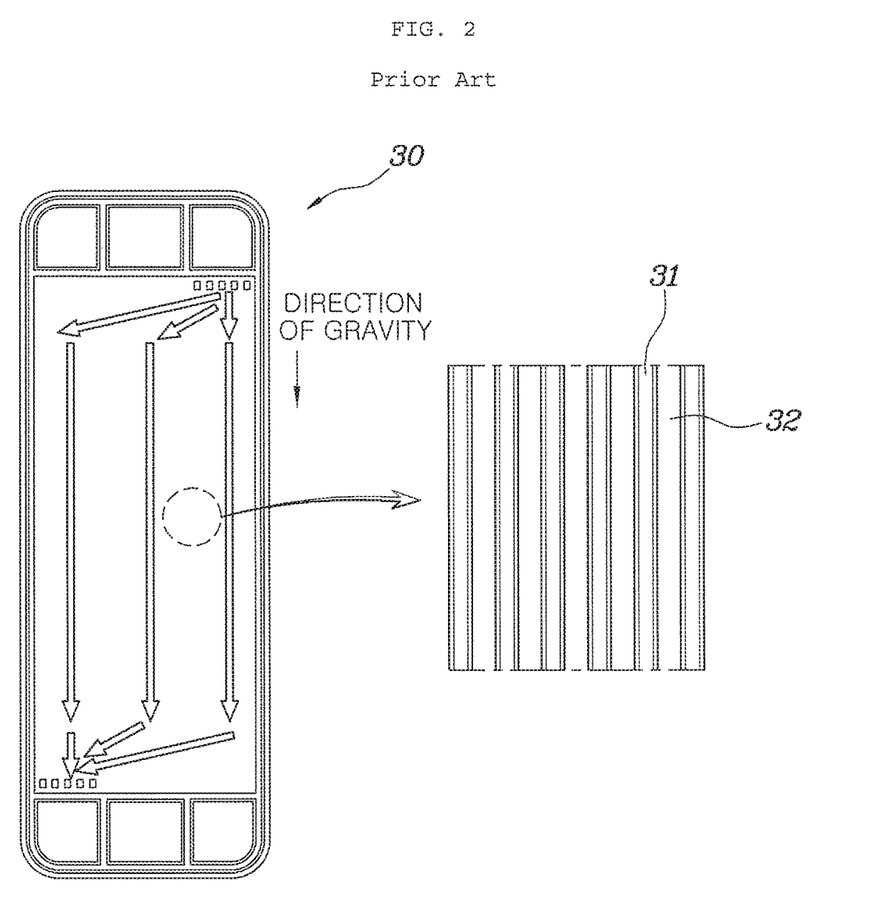
FIG. 2 is a view illustrating a conventional separator for a fuel cell.

FIG. 2 is a view illustrating a conventional separator 30 for a fuel cell, which is structured such that a channel portion 31 and a land portion 32 are formed in the direction of gravity in order to make the flow direction of reaction gas identical to the direction of gravity. Such a structure may have an advantage in that generated water is discharged smoothly.

The generated water flowing through the separator functions to maintain the performance of the cell by maintaining the humidity of the reaction gas flowing into the cell at a proper level. However, if excessive generated water is discharged, the moisture within the cell is reduced and the interior of the cell becomes dry. As a result, the moisture content within the electrolyte membrane is lowered, and the performance of the cell is degraded.

SUMMARY

The present disclosure has been made in view of the above problems, and it is an object of the present disclosure to provide a separator for a fuel cell, which is capable of effectively discharging generated water and of improving humidification.

In accordance with the present disclosure, a separator for a fuel cell has a plurality of channels formed in a reaction surface in the direction of gravity and configured to permit reaction gas and generated water to flow therethrough. The fuel cell includes a membrane electrode assembly (MEA) and a gas diffusion layer (GDL). The channels have a wave shape in the reaction surface, and each of the channels includes alternately arranged curved portions and straight portions.

Each of the curved portions of the channels may have a larger width than each of the straight portions.

Two side walls defining each of the curved portions of the channels may have different curvatures from each other.

A flat surface of a land located adjacent to each of a reaction gas inflow region and a reaction gas exhaust region of each of the curved portions of the channels may have a smaller width than a flat surface of a land located adjacent to a middle region of each of the curved portions.

A side wall of a land located adjacent to each of a reaction gas inflow region and a reaction gas exhaust region of each of the curved portions of the channels may be inclined at an angle smaller than the angle at which a side wall of a land located adjacent to a middle region of each of the curved portions is inclined.

Each of the channels may be formed such that a pitch of a wave is gradually shortened from an upper portion of the separator to a lower portion of the separator in the direction of gravity.

Each of the channels may be formed such that a curvature of a wave is gradually increased from an upper portion of the separator to a lower portion of the separator in the direction of gravity.

A reaction gas inflow region of each of the curved portions of the channels may be longer than a reaction gas exhaust region of each of the curved portions.

Each of the curved portions of the channels, in which the reaction gas inflow region is formed to be longer than the reaction gas exhaust region, may be formed in a lower region of the reaction surface in the direction of gravity.

The reaction gas may be oxygen, and the reaction surface may be a surface of the MEA that is opposite an air electrode which is a cathode.

BRIEF DESCRIPTION OF THE DRAWINGS

The above and other objects, features and other advantages of the present disclosure will be more clearly understood from the following detailed description taken in conjunction with the accompanying drawings, in which:

FIGS. 4 to 6B are constitutional views illustrating examples of modification of a width of a channel in the separator according to the present disclosure;

DETAILED DESCRIPTION

Reference will now be made in detail to embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Wherever possible, the same reference numbers will be used throughout the drawings to refer to the same or like parts.

Figure 3:
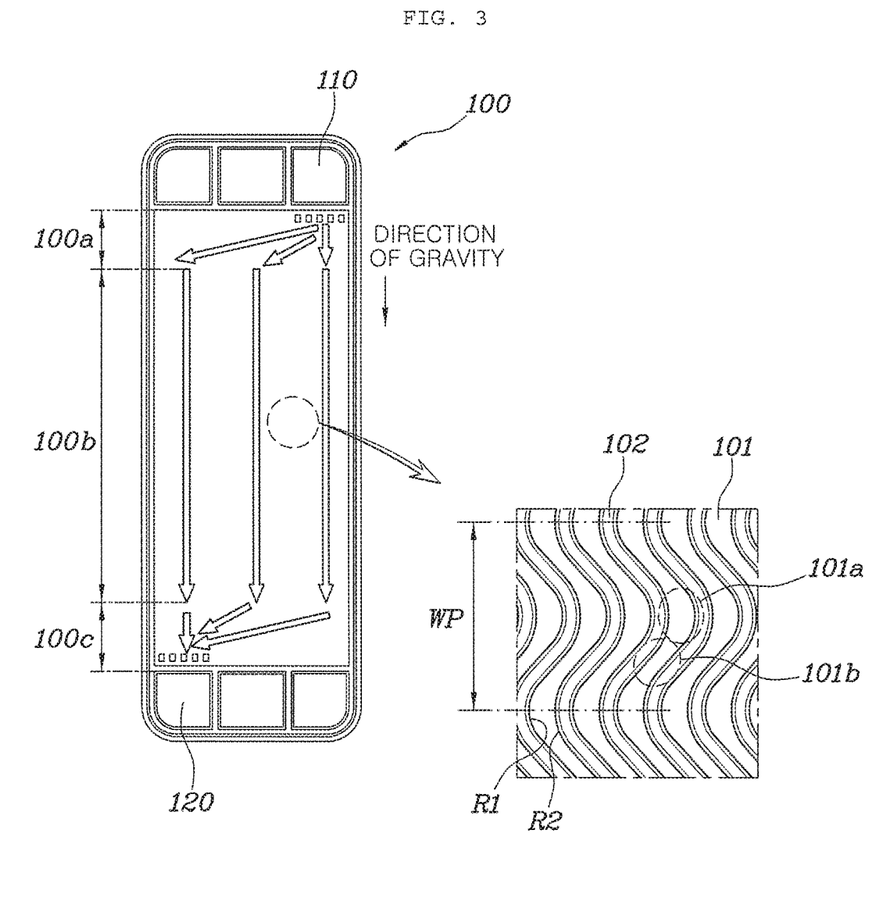
FIG. 3 is a view illustrating a separator for a fuel cell according to an embodiment of the present disclosure.

FIG. 3 is a view illustrating a separator for a fuel cell according to an embodiment of the present disclosure, and FIGS. 4 to 8 are constitutional views illustrating examples of modification of the shape of a channel in the separator according to the present disclosure.

As shown in FIG. 3, a separator 100 for a fuel cell according to an embodiment of the present disclosure is a unit cell of a fuel cell stack, which further includes a membrane electrode assembly (MEA) and a gas diffusion layer (GDL), and is structured such that a plurality of channels 101 and lands 102, through which reaction gas and generated water flow, is formed in a reaction surface in the direction of gravity. For example, an inlet manifold 110, through which the reaction gas is supplied, is formed in the upper portion of the separator based on the direction of gravity, and an outlet manifold 120, through which surplus reaction gas and generated water are discharged, is formed in a lower portion of the separator.

The channels 101 and the lands 102, through which the reaction gas flows, are formed in the region between the inlet manifold 110 and the outlet manifold 120. The region in which the channels 101 and the lands 102 are formed is divided into a diffusion portion 100a, in which the reaction gas supplied from the inlet manifold 110 is diffused, a reaction surface 100b, through which the diffused reaction gas flows in the direction of gravity, and a collection portion 100c, through which the surplus reaction gas and generated water flow toward the outlet manifold 120.

As a result of the channels being formed in the direction of gravity, even when a relatively large amount of generated water flows suddenly into the channels, it is possible to discharge the generated water more easily using gravity and the differential pressure of the gas than in the case of the structure in which the inlet manifold and the outlet manifold are arranged in the left-right direction and the channels are therefore formed in the left-right direction.

Further, the channels 101 of the separator 100 in this embodiment have an improved shape, more specifically, the channels 101 formed in the reaction surface 100b have an improved shape, which ensures smooth discharge of the reaction gas and the generated water while increasing the residence time of the generated water to an extent capable of maintaining the humidity of the reaction gas supplied to the cell at a desired level without undesired retention of the generated water in the channels 101. Here, the reaction gas refers to oxygen, and the reaction surface refers to the surface of the membrane electrode assembly (MEA) that is opposite the air electrode (cathode).

To this end, the separator 100 for a fuel cell according to this embodiment includes a plurality of channels 101 that are formed in a wave shape in the reaction surface 100b, and the wave-type channels 101 have curved portions 101a and straight portions 101b, which are alternately arranged. Therefore, the channels 101 are increased in length, which results in an increase in the residence time of the generated water in the reaction surface 100b.

Further, when the generated water flows through the curved portions 101a and the straight portions 101b of the channels 101, the speed at which the generated water flows through the curved portions 101a is lower than the speed at which the generated water flows through the straight portions 101b, and the time that the generated water takes to flow through the curved portions 101a is therefore increased. As a result, the residence time of the generated water in the reaction surface 100b is increased, and the diffusion efficiency of the reaction gas is improved.

The channels 101 may be formed such that the curved portions 101a and the straight portions 101b have the same width as each other; however, it is also possible to adjust the retention and discharge of the generated water by varying the width of the channels 101.

Figure 4:
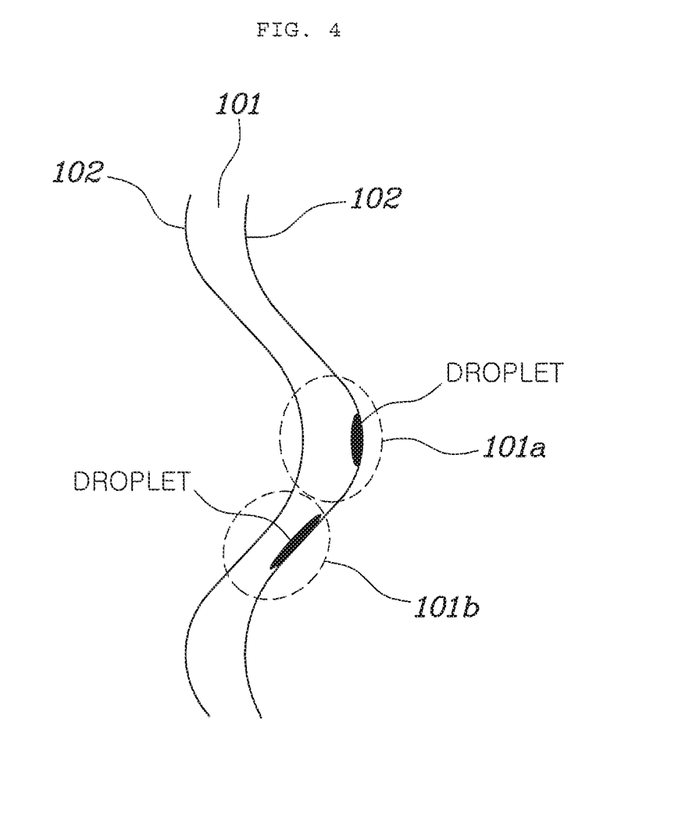

FIG. 4 is a constitutional view illustrating an example of modification of the width of the channel in the separator according to the present disclosure. As shown in FIG. 4, the channel 101 may be formed such that the width of the curved portion 101a is larger than that of the straight portion 101b.

As a result of the curved portion 101a and the straight portion 101b being formed to have different widths from each other, the speed at which the reaction gas flows through the relatively wide curved portion 101a of the channel 101 becomes low, and a retention region is formed. Accordingly, the diffusion efficiency of the gas is improved, and water discharge is inhibited.

Further, even when the generated water stays in the retention region in the curved portion 101a and droplets are thus generated, the droplets move to the straight portion 101b. Since the width of the channel 101 is decreased in the straight portion 101b, the flow speed of the reaction gas becomes high. As a result, the speed at which the droplets are generated becomes low, or the droplets evaporate, thereby adjusting the humidity in the cell.

If the width of the straight portion 101b is set to be larger than that of the curved portion 101a, the flow speed in the straight portion 101b is lower than that in the curved portion 101a, which causes the generation of droplets in the straight portion 101b. However, the generated droplets may not pass through the relatively narrow curved portion 101a and may block the same, by which a region in which the reaction cannot occur may be formed, or a flooding phenomenon may occur at a low temperature. Because this does not sufficiently satisfy the operating condition of the cell of the fuel cell stack, the width of the curved portion 101a may be set to be larger than that of the straight portion 101b.

The methods of varying the width of the channel 101 may be diversely realized.

For example, as shown in FIG. 3, two side walls, which define the curved portion 101a of the channel 101, are formed to have different curvatures R1 and R2 from each other (i.e. R1≠R2). As a result, the width of the curved portion 101a of the channel 101 varies while the land 102 has a uniform width.

FIGS. 5A-6B are constitutional views illustrating examples of modification of the width of the channel in the separator according to the present disclosure.

Figures 5A, 5B:
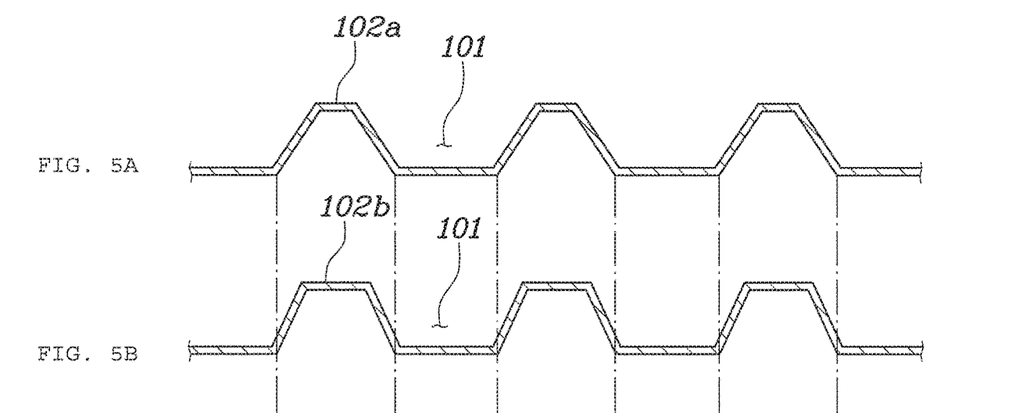

As shown in FIGS. 5A and 5B, a flat surface 102a of the land 102, which is located adjacent to each of the reaction gas inflow region and the reaction gas exhaust region of the curved portion 101a of the channel 101, has a smaller width than a flat surface 102b of the land 102, which is located adjacent to the middle region of the curved portion 101a. Accordingly, the curved portion 101a of the channel 101 is formed such that the width between the two side walls defining the curved portion 101a of the channel 101 varies while the bottom surface of the curved portion 101a has a uniform width. FIG. 5A shows the reaction gas inflow region or the reaction gas exhaust region of the curved portion 101a of the channel 101, that is, the relatively wide region of the channel 101, and FIG. 5B shows the middle region of the curved portion 101a of the channel 101, that is, the relatively narrow region of the channel 101.

Figure 6A:
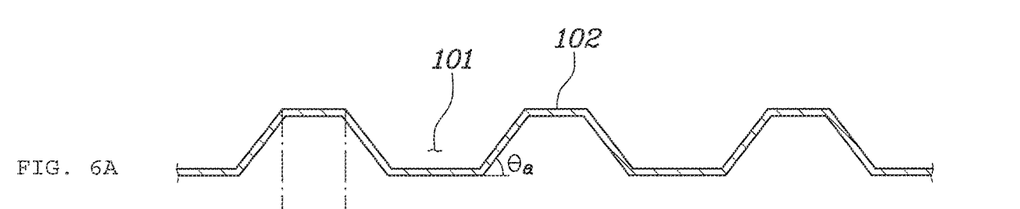
Figure 6B:
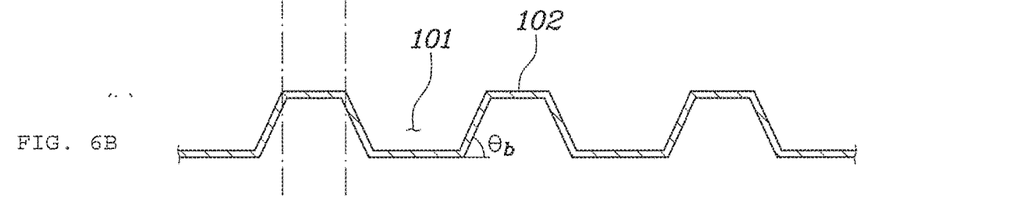

Alternatively, as shown in FIGS. 6A and 6B, a side wall of the land 102, which is located adjacent to each of the reaction gas inflow region and the reaction gas exhaust region of the curved portion 101a of the channel 101, is inclined at an angle θa smaller than an angle θb at which a side wall of the land 102 that is located adjacent to the middle region of the curved portion 101a is inclined. Accordingly, the width between the two side walls defining the curved portion 101a of the channel 101 varies while the flat surface of the land 102 that is located adjacent to the curved portion 101a of the channel 101 has a uniform width. FIG. 6A shows the reaction gas inflow region or the reaction gas exhaust region of the curved portion 101a of the channel 101, that is, the relatively wide region of the channel 101, and FIG. 6B shows the middle region of the curved portion 101a of the channel 101, that is, the relatively narrow region of the channel 101.

Under a low-humidity condition of the cell of the fuel cell stack, the moisture content is gradually decreased from the inlet manifold 110 to the outlet manifold 120 (in the case of an anode).

Retention and discharge of the generated water may be adjusted by varying a wave pitch of the channel 101 depending on the sections.

Figure 7A:
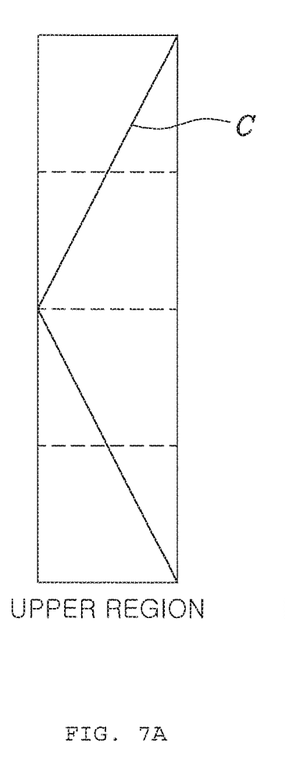
FIGS. 7A-7C are constitutional views illustrating an example of modification of a pitch of the channel in the separator according to the present disclosure.
Figure 7B:
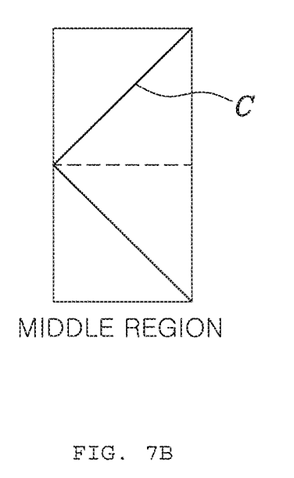
Figure 7C:
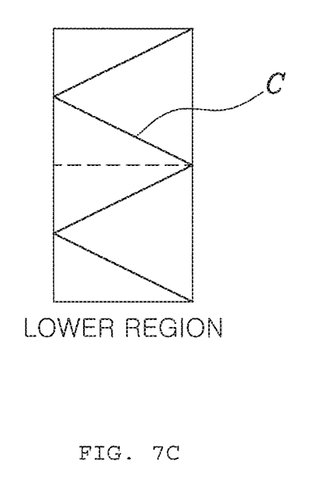

FIGS. 7A-7C are constitutional views illustrating an example of modification of the pitch of the channel in the separator according to the present disclosure. As shown in FIGS. 7A-7C, the channel 101 may be formed such that the wave pitch thereof is gradually shortened from the upper portion of the separator to the lower portion of the separator in the direction of gravity. At this time, the channel 101 may have a uniform width (amplitude). Here, "C" in FIGS. 7A-7C refers to an imaginary line for explaining the wave pitch of the channel 101.

As a result of a portion of the channel 101 located in the upper region of the reaction surface being formed to have a relatively large wave pitch, the straight portion 101b is lengthened, and the flow speed of the reaction gas is increased, thereby rapidly discharging the generated water introduced into the channel in the direction of gravity.

The wave pitch of a portion of the channel 101 located in the middle region of the reaction surface 100b is reduced so as to be smaller than that in the upper region of the reaction surface 100b, and the wave pitch of a portion of the channel 101 located in the lower region of the reaction surface 100b is minimized. As a result of the channel 101 being formed such that the wave pitch thereof is gradually shortened from the upper region of the reaction surface to the lower region of the reaction surface in the direction of gravity, the flow of the reaction gas slows down as it goes toward the lower region of the reaction surface, thereby inhibiting the discharge of generated water.

In addition, since the wave pitch of the channel 101 is gradually shortened from the upper region of the reaction surface to the lower region of the reaction surface in the direction of gravity, the curvature of the wave-type channel 101 is gradually increased from the upper region of the reaction surface to the lower region of the reaction surface in the direction of gravity, and the angle of the valley of the channel 101 is therefore decreased. As a result, the flow of the reaction gas slows down, and the discharge of generated water is inhibited.

As described above, the channel 101 may be designed so as to inhibit the discharge of generated water and to increase the moisture content in the cell by varying the pitch and curvature of the wave-type channel 101. Further, this structure makes it possible to alleviate dry-out in the inlet region of the air electrode (cathode) under a high-flow-rate condition and to adjust the moisture content under a low-flow-rate condition.

In addition, the retention and discharge of the generated water may be adjusted by varying the shape of the curved portion 101a of the channel 101.

Figure 8:
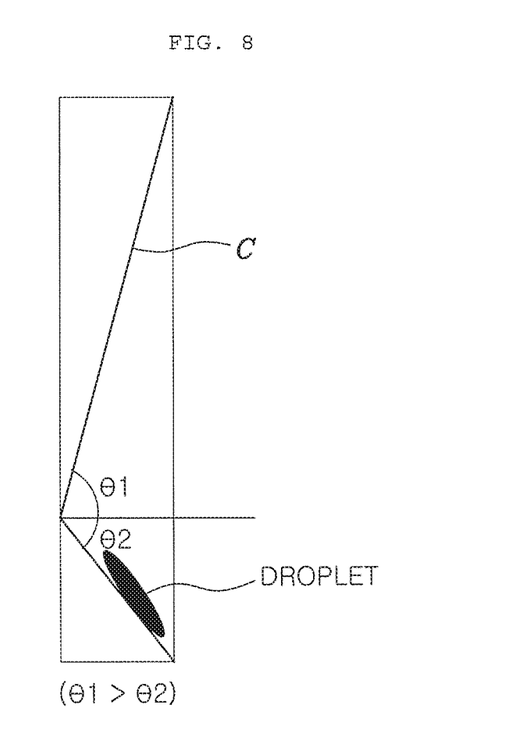
FIG. 8 is a constitutional view illustrating an example of modification of a curved portion of the channel in the separator according to the present disclosure.

FIG. 8 is a constitutional view illustrating an example of modification of the curved portion of the channel in the separator according to the present disclosure. As shown in FIG. 8, the reaction gas inflow region of the curved portion 101a of the channel 101 may be formed to have a length longer than the reaction gas exhaust region of the curved portion 101a of the channel 101. Here, "θ1" in FIG. 8 refers to the angle of the reaction gas inflow region of the curved portion (the angle of the valley of the wave), and "θ2" in FIG. 8 refers to the angle of the reaction gas exhaust region of the curved portion.

As a result of the angle θ1 of the reaction gas inflow region of the curved portion 101a being larger than the angle θ2 of the reaction gas exhaust region of the curved portion 101a, the reaction gas inflow region of the curved portion 101a of the channel 101 is lengthened longer than the reaction gas exhaust region of the curved portion 101a of the channel 101.

Accordingly, when droplets are generated in the curved portion 101a, the residence time of the generated water and the reaction gas in the reaction surface is increased, and the reaction efficiency is improved.

As is apparent from the above description, the present disclosure provides a separator for a fuel cell, which is capable of smoothly discharging generated water through a channel by improving the shape of the channel and of preventing dry-out in a cell by increasing the flow time of the generated water.

Further, humidification in the cell is improved by increasing the residence time of the generated water in the channel as it goes from the upper region of the reaction surface to the lower region of the reaction surface in the direction of gravity.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A separator for a fuel cell having a plurality of channels, which are formed in a reaction surface in a direction of gravity and configured to allow reaction gas and generated water to flow therethrough,
   wherein the channels have a wave shape in the reaction surface, each of channels including alternately arranged curved portions and straight portions,
   wherein each of the curved portions of the channels has a larger width than each of the straight portions, and
   wherein two side walls defining each of the curved portions of the channels have different curvatures from each other.

2. A separator for a fuel cell having a plurality of channels, which are formed in a reaction surface in a direction of gravity and configured to allow reaction gas and generated water to flow therethrough,
   wherein the channels have a wave shape in the reaction surface, each of channels including alternately arranged curved portions and straight portions,
   wherein each of the curved portions of the channels has a larger width than each of the straight portions, and
   wherein a flat surface of a land located adjacent to each of a reaction gas inflow region and a reaction gas exhaust region of each of the curved portions of the channels has a smaller width than a flat surface of a land located adjacent to a middle region of each of the curved portions.

3. A separator for a fuel cell having a plurality of channels, which are formed in a reaction surface in a direction of gravity and configured to allow reaction gas and generated water to flow therethrough,
   wherein the channels have a wave shape in the reaction surface, each of channels including alternately arranged curved portions and straight portions,
   wherein each of the curved portions of the channels has a larger width than each of the straight portions, and
   wherein a side wall of a land located adjacent to each of a reaction gas inflow region and a reaction gas exhaust region of each of the curved portions of the channels is inclined at an angle smaller than an angle at which a side wall of a land located adjacent to a middle region of each of the curved portions is inclined.

4. The separator according to claim 1, wherein each of the channels is formed such that a pitch of a wave is gradually shortened from an upper portion of the separator to a lower portion of the separator in the direction of gravity.

5. The separator according to claim 1, wherein each of the channels is formed such that a curvature of a wave is gradual increased from an upper portion of the separator to a lower portion of the separator in the direction of gravity.

6. The separator according to claim 1, wherein a reaction gas inflow region of each of the curved portions of the channels is longer than a reaction gas exhaust region of each of the curved portions.

7. The separator according to claim 6, wherein each of the curved portions of the channels, in which the reaction gas inflow region is formed to be longer than the reaction gas exhaust region, is formed in a lower region of the reaction surface in the direction of gravity.

8. The separator according to claim 1, wherein the fuel cell includes a membrane electrode assembly (MEA) and a gas diffusion layer (GDL), and
   wherein the reaction gas is oxygen, and the reaction surface is a surface of the MEA that is opposite an air electrode which is a cathode.

9. The separator according to claim 2, wherein each of the channels is formed such that a pitch of a wave is gradually shortened from an upper portion of the separator to a lower portion of the separator in the direction of gravity.

10. The separator according to claim 2, wherein each of the channels is formed such that a curvature of a wave is gradually increased from an upper portion of the separator to a lower portion of the separator in the direction of gravity.

11. The separator according to claim 2, wherein a reaction gas inflow region of each of the curved portions of the channels is longer than a reaction gas exhaust region of each of the curved portions.

12. The separator according to claim 11, wherein each of the curved portions of the channels, in which the reaction gas inflow region is formed to be longer than the reaction gas exhaust region, is formed in a lower region of the reaction surface in the direction of gravity.

13. The separator according to claim 2, wherein the fuel cell includes a membrane electrode assembly (MEA) and a gas diffusion layer (GDL), and
   wherein the reaction gas is oxygen, and the reaction surface is a surface of the MEA that is opposite an air electrode which is a cathode.

14. The separator according to claim 3, wherein each of the channels is formed such that a pitch of a wave is gradually shortened from an upper portion of the separator to a lower portion of the separator in the direction of gravity.

15. The separator according to claim 3, wherein each of the channels is formed such that a curvature of a wave is gradually increased from an upper portion of the separator to a lower portion of the separator in the direction of gravity.

16. The separator according to claim 3, wherein a reaction gas inflow region of each of the curved portions of the channels is longer than a reaction gas exhaust region of each of the curved portions.

17. The separator according to claim 16, wherein each of the curved portions of the channels, in which the reaction gas inflow region is formed to be longer than the reaction gas exhaust region, is formed in a lower region of the reaction surface in the direction of gravity.

18. The separator according to claim 3, wherein the fuel cell includes a membrane electrode assembly (MEA) and a gas diffusion layer (GDL), and wherein the reaction gas is oxygen, and the reaction surface is a surface of the MEA that is opposite an air electrode which is a cathode.

* * * * *